United States Patent

[11] 3,604,263

| [72] | Inventors | Michel Joseph Auphan<br>Neuilly;<br>Jean Perilhou, Bourg La Reine, both of,<br>France |
|---|---|---|
| [21] | Appl. No. | 794,495 |
| [22] | Filed | Jan. 28, 1969 |
| [45] | Patented | Sept. 14, 1971 |
| [73] | Assignee | U.S. Philips Corporation<br>New York, N.Y. |
| [32] | Priority | Jan. 31, 1968 |
| [33] | | France |
| [31] | | 138125 |

[54] DEVICE FOR MEASURING THE FLOW INTENSITY OF CIRCULATING LIQUID
9 Claims, 3 Drawing Figs.

[52] U.S. Cl. .................................................. 73/204
[51] Int. Cl. .................................................. G01p 5/10
[50] Field of Search ........................................ 73/204; 128/2.05

[56] References Cited
UNITED STATES PATENTS

| 3,075,515 | 1/1963 | Richards | 128/2.05 |
| 3,312,106 | 4/1967 | Davis | 128/2.05 X |
| 3,359,974 | 12/1967 | Khalil | 128/2.05 |

OTHER REFERENCES

Netherlands Printed App. No. 6610470, Jan. 30, 1967, 128-205

*Primary Examiner*—Charles A. Ruehl
*Attorney*—Frank R. Trifari

ABSTRACT: A device for measuring liquid flow in a channel includes a first elongated tube open at one end and insertable through a channel wall. A flexible tube extends through the first tube and out the open end into the channel for supplying an auxiliary liquid thereto at a known flow rate via outlet openings provided near the front end of the tube. First, second and third thermosensitive elements for measuring the temperatures of the channel liquid, the auxiliary liquid and the mixed liquids, respectively, are disposed outside of the flexible tube, within the flexible tube, and near the front end of the flexible tube within the channel, respectively.

PATENTED SEP 14 1971    3,604,263

INVENTORS
MICHEL J. AUPHAN
BY JEAN PERILHOU

AGENT

DEVICE FOR MEASURING THE FLOW INTENSITY OF CIRCULATING LIQUID

The present invention relates to a device for measuring the flow intensity of a circulating liquid passing through a more or less uniform channel, more particularly to a device for measuring the blood circulation in the blood vessels in the human body.

The invention particularly relates to a device comprising two substantially paraxial tubes introduced into the channel, one of which, the injection tube, serves as an insert tube for the other tube, which is flexible. An auxiliary liquid is supplied to the channel and a flow meter is provided for measuring the flow strength of this liquid. Thermosensitive elements are employed for measuring the temperature of the channel liquid, of the auxiliary liquid and of the mixture of both of them. Such a device is known in which the mouth of the insert tube is located upstream with respect to the mouth of the introduced tube. The auxiliary liquid is then supplied through the first-mentioned tube and the same quantity of liquid is withdrawn from the channel through the last-mentioned tube consisting of the local mixture of the liquids. This device has the drawback that the auxiliary liquid is supplied in the region between the injection opening and the opening for withdrawing liquid from the channel. This involves a disturbance of the flow pattern which hinders the blood circulation during the measurement of the flow of blood through the veins of the human body.

An object of the invention is to provide an apparatus that avoids this disadvantage of the device described above. According to the invention, measuring points are provided, for measuring the temperatures on the outer side of the inserted flexible tube, inside the passage thereof and at the closed end beyond one or more outlet openings provided in the tube wall in the proximity of the tube end. When the injection tube is employed for withdrawing liquid and the same quantity of auxiliary liquid is supplied through the flexible tube, the channel is prevented from being filled excessively in the region between the injection tube and the end of the inserted tube. In this region the product $(D-d)T_p$ is a measure of the thermal content of the liquid, wherein $D$ designates the initial flow strength, $d$ the flow strength of the withdrawn liquid and $T_p$ the temperature of the channel. In the inserted tube the thermal content of the auxiliary liquid is expressed by $dT_a$ and at the end of this tube the initial flow strength is restored at the temperature $T_m$ of the liquid mixture. It follows therefrom:

$$(D-d)T_p + dT_a = DT_m,$$

and therefore: $D = dT_p - T_a/T_p - T_m$

A few features of the device according to the invention will now be considered in greater detail with reference to the drawing, in which.

Figure 1:
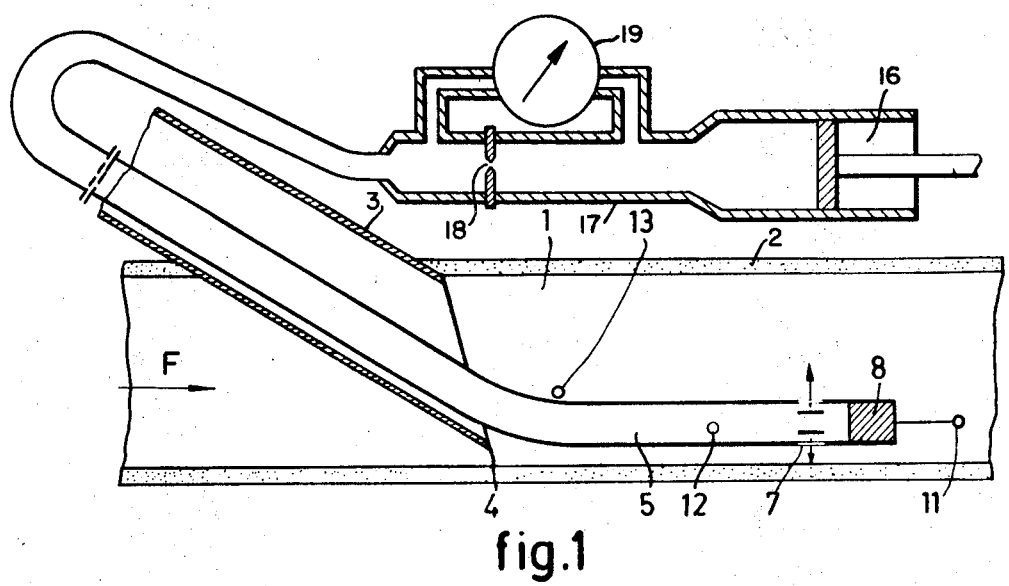
FIG. 1 shows diagrammatically part of the device essential for the invention.

The wall 2 of a circulation channel 1 is pierced by an injection tube or needle 3 which is chambered so that is terminates approximately in a plane at right angles to the axis of the channel. In the case of a circular sectional area of the injection tube 3 the terminal opening has a shape differing greatly from the channel section, particularly from the vein section for measuring the flow strength. It may therefore be advantageous to provide an oval section of the tube, the sectional area of which is substantially circular.

The injection tube 3 receives a thinner tube 5 slipped beyond the terminal opening of the tube 3 in the channel 1, for which purpose it has to be flexible. Similar to known catheters it is made of a flexible synthetic resin. The auxiliary liquid is supplied to the flexible tube 5 by means of a syringe 16. The velocity of the auxiliary liquid is measured by means of a tube 17 having a restricted opening 18 that produces a pressure drop that varies with the liquid velocity. This pressure drop is measured with a differential manometer 19.

Figure 2:
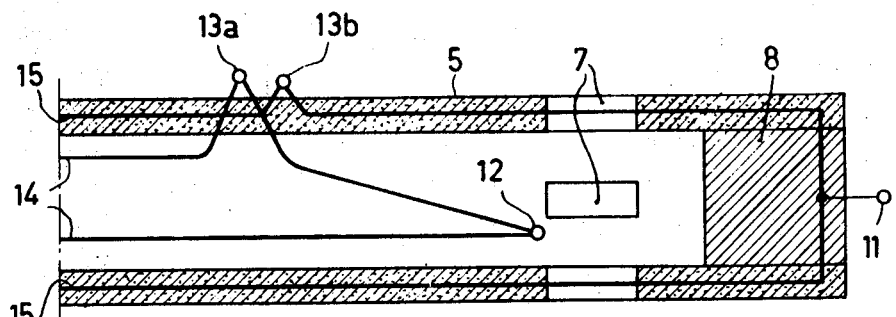
FIG. 2 shows in detail the disposition of the measuring points.

The injection tube 3 is pierced through the channel wall 2 so that the catheter 5 extends in the direction of flow F of the channel liquid beyond the opening of the tube 3. As is common practice in this type of device, the same quantity of liquid is withdrawn from the flow channel as is supplied thereto in the form of the auxiliary liquid. The difference being, however, that in this case the injection tube 3 serves for withdrawing liquid and the catheter 5 is employed for the supply of the auxiliary liquid. From FIG. 1 it will be apparent that the liquid is withdrawn at a place upstream with respect to the point of supply of the auxiliary liquid. Therefore, in the intermediate region the channel is not excessively filled so that adverse effects on the liquid circulation are avoided. In order to implement this situation, while a useful measuring result is maintained, the measuring points for the temperature measurement are disposed as follows. The measuring point 11 is arranged beyond the end of the catheter 5, which is closed by a plug 8. At this place the liquid of the channel 1 is mixed with the auxiliary liquid supplied through the outlet openings 7 in the wall of the catheter 5. At this point the temperature $T_m$ of the mixture is measured. A measuring point 12 inside the catheter 5 provides the temperature $T_a$ of the auxiliary liquid. On the outer side of the catheter 5, near the opening of the injection tube, the measuring point 13 is provided for measuring the liquid temperature $T_p$ in the channel 1. The measuring points may be formed by thermoelements. The measuring voltages are derived by means of two wires which are preferably arranged in the wall of the catheter tube, as is indicated in FIG. 2. The inner diameter of the tube 5 may be 0.5 mm. and the outer diameter may be 1.5 mms. The wall accommodates four electric conductors. From FIG. 3 it will be apparent that this number of wires is sufficient for measuring the temperature differences between the channel liquid and the auxiliary liquid and between the channel liquid and the mixture, which is required for calculating the flow strength.

Figure 3:
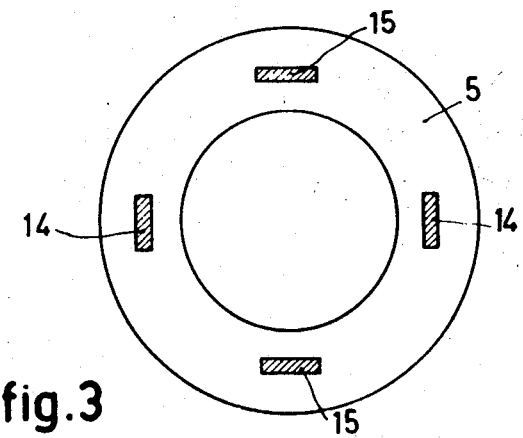
FIG. 3 is a sectional view of the inserted tube.

FIG. 3 shows in detail that the thermosensitive elements 12 and 13a and the thermosensitive elements 11 and 13b form two separate current circuits 14 and 15, each of which indicates the temperature difference between the two associated thermosensitive elements so that in the current circuit 14 the temperature difference $T_p - T_a$ is measured between the channel liquid and the auxiliary liquid. In the current circuit 15 the temperature difference $T_p - T_m$ of the channel liquid and the mixture resulting from the outflow of the auxiliary liquid in the channel 1 is measured.

A particular advantage of the invention is the use of a catheter tube in which the thermosensitive elements are integral with the tube for measuring the flow of the liquid through the channel. This device is especially useful in a blood vessel in which the flow strength of the liquid is comparatively high with respect to the flow velocity of the auxiliary liquid supplied, particularly when the blood volume per minute has to be measured in a large vein in which the catheter is introduced through a small vein. It is known to dispose a catheter in the proximity of the heart through a vein, for example, of the arm, in which case the length of the catheter tube may be 30 to 50 cms. In such a measurement no liquid is withdrawn from the vein since this would require operative steps, and since adverse effects on the blood circulation can be avoided, when an auxiliary liquid is introduced into a wide vein with a comparatively low flow strength, which is restricted by the dimensions of the catheter.

What is claimed is:

1. A device for measuring the flow strength of a liquid passing through a channel, comprising two substantially paraxial tubes adapted to be introduced into the channel, one of which, the injection tube, has an opening at one end and serves as an insert tube for the second tube, which is flexible and is closed at the insertable end and is provided with one or more outlet openings in the wall near the closed end of the tube, means for supplying an auxiliary liquid to said flexible tube, a flow meter arranged to measure the flow strength of said auxiliary liquid, and a plurality of thermosensitive elements for measuring the temperature of the liquid passing through the channel, the auxiliary liquid and the two mixed liquids, said elements being disposed on the outside of the flexible tube, inside the passage thereof and near the closed end of the tube beyond said outlet openings, respectively.

2. A device as claimed in claim 1 further comprising a plurality of current conductors connected to the thermosensitive elements and accommodated in the wall of the flexible tube.

3. A device as claimed in claim 1 characterized in that the thermosensitive element near the end of the tube is connected to a first thermosensitive element on the outside thereof and the thermosensitive element inside the passage is connected to a second thermosensitive element on the outside of the tube so that the measuring results obtained therefrom correspond directly to the temperature differences at the measuring points.

4. A device as claimed in claim 1 wherein the thermosensitive elements and the flexible tube are arranged to form a unitary structure.

5. A device for measuring the flow of a liquid passing through a channel comprising, a first elongated tube open at one end and capable of being inserted through a wall of the channel, a flexible tube axially extending through said first tube and insertable out the open end into the channel downstream for supplying an auxiliary liquid to the channel at a known rate of flow, said flexible tube being closed at the insertable end and having one or more outlet openings for the auxiliary liquid in its wall near said closed end, a first thermosensitive element disposed in the channel at a point on the outside of the flexible tube for measuring the temperature of the channel liquid, a second thermosensitive element disposed within the flexible tube for measuring the temperature of the auxiliary liquid, and a third thermosensitive element disposed in the channel near the closed end of the flexible tube and downstream of said outlet openings for measuring the temperature of the mixed channel and auxiliary liquids.

6. A device as claimed in claim 5 further comprising a fourth thermosensitive element for measuring the temperature of the channel liquid, said first and fourth thermosensitive elements being mounted on the outside of the flexible tube at a point upstream from the outlet openings and in close proximity to one another, said third thermosensitive element being mounted on the closed end of the flexible tube.

7. A device as claimed in claim 6 further comprising, a first electrical conductor connecting said first and second thermosensitive elements in series and extending through said flexible tube to provide a pair of output terminals at which an electrical signal is produced that is proportional to the temperature difference between the channel liquid and the auxiliary liquid, and a second electrical conductor connecting said third and fourth thermosensitive elements in series and extending through said flexible tube to provide a second pair of output terminals at which an electric signal is produced that is proportional to the temperature difference between the channel liquid and the mixed liquids.

8. A device as claimed in claim 7 wherein at least a portion of one of said conductors is embedded within the wall of the flexible tube.

9. A method of measuring the rate of flow of a liquid flowing in a channel comprising the following steps: introducing a hollow tube having an open end through a wall of the channel, inserting a flexible tube through the hollow tube and out through open end thereof into the channel, said flexible tube having outlet openings near the end inserted into the channel, introducing an auxiliary liquid into the channel at a known rate of flow via said flexible tube, determining the temperature difference between the channel liquid and the auxiliary liquid by means of thermosensitive elements disposed outside of the flexible tube within the channel and within the flexible tube, respectively, determining the temperature difference between the channel liquid and the mixed liquids by means of thermosensitive elements disposed outside of the flexible tube within the channel and within the channel near the front end of the flexible tube but downstream of the outlet openings therein, and determining the rate of flow of the channel liquid by finding the product of the rate of flow of the auxiliary liquid and the quotient of said two temperature differences.